(12) United States Patent
Kiyohiro et al.

(10) Patent No.: US 11,912,160 B2
(45) Date of Patent: Feb. 27, 2024

(54) HYBRID-TYPE ENGINE GENERATOR CONTROLLER

(71) Applicant: Honda Motor Co., Ltd., Tokyo (JP)

(72) Inventors: Yukihiko Kiyohiro, Wako (JP); Taiyo Onodera, Wako (JP); Minoru Maedako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 785 days.

(21) Appl. No.: 17/042,166

(22) PCT Filed: Mar. 29, 2018

(86) PCT No.: PCT/JP2018/013447
§ 371 (c)(1),
(2) Date: Sep. 27, 2020

(87) PCT Pub. No.: WO2019/186960
PCT Pub. Date: Oct. 3, 2019

(65) Prior Publication Data
US 2021/0023961 A1  Jan. 28, 2021

(51) Int. Cl.
*B60L 58/15*  (2019.01)
*H02J 7/00*  (2006.01)
*H02J 7/16*  (2006.01)

(52) U.S. Cl.
CPC ............ *B60L 58/15* (2019.02); *H02J 7/0048* (2020.01); *H02J 7/16* (2013.01)

(58) Field of Classification Search
CPC .............................. B60L 58/15; H02J 7/0048
USPC ........................................................ 320/134
See application file for complete search history.

(56) References Cited

U.S. PATENT DOCUMENTS

| | | | | |
|---|---|---|---|---|
| 2007/0210728 A1* | 9/2007 | Musser | ................... | B60W 20/11 318/53 |
| 2007/0213891 A1* | 9/2007 | Musser | ................... | B60W 20/11 701/22 |
| 2011/0098873 A1* | 4/2011 | Koga | ...................... | B60L 50/40 180/65.265 |

(Continued)

FOREIGN PATENT DOCUMENTS

JP  2011189889 A  9/2011
JP  2011234458 A  11/2011
(Continued)

OTHER PUBLICATIONS

International Preliminary Examination Report; Application PCT/JP2018/013447; dated Mar. 24, 2020.
(Continued)

*Primary Examiner* — Mohammed Alam
(74) *Attorney, Agent, or Firm* — Duft & Bornsen, PC (57) ABSTRACT

In an inverter generator controller, residual charge of a battery is detected and generated power output is detected. Then, low-load charging of the battery is implemented if the detected generated power output of the engine generator unit is equal to or greater than the detected load output demand and the detected generated power output of the engine generator unit is less than the predetermined low-load value a, when the detected residual charge of the battery is equal to or less than the first threshold value. When the detected residual charge of the battery becomes greater than the first threshold value, the low-load charging of the battery is terminated.

3 Claims, 4 Drawing Sheets

(56) References Cited

U.S. PATENT DOCUMENTS

| | | | | |
|---|---|---|---|---|
| 2012/0193988 A1* | 8/2012 | Eschrich | ................. | B60L 50/61 |
| | | | | 307/66 |
| 2015/0197238 A1* | 7/2015 | Itoh | ........................ | B60L 58/12 |
| | | | | 180/65.265 |
| 2020/0164854 A1* | 5/2020 | Obata | ..................... | B60L 50/75 |

FOREIGN PATENT DOCUMENTS

| | | | |
|---|---|---|---|
| JP | 2017171192 | A | 9/2017 |
| WO | 2012043479 | A1 | 4/2012 |
| WO | 2012111128 | A1 | 8/2012 |
| WO | 2013021446 | A1 | 2/2013 |

OTHER PUBLICATIONS

International Search Report; Application PCT/JP2018/013447; dated Apr. 24, 2018.
Chinese office action; Application 201880091883.8; dated Jul. 19, 2023.

\* cited by examiner

HYBRID-TYPE ENGINE GENERATOR CONTROLLER

TECHNICAL FIELD

This invention relates to a controller of a hybrid-type engine generator that is driven by a battery and an engine and incorporates an engine generator unit.

BACKGROUND ART

Since an increase in load output demand from an engine generator causes engine speed to increase, it results in increased noise. Generally in a hybrid-type engine generator, a decline in battery residual charge (state of charge) is often dealt with by increasing engine speed in order to charge the battery, so that noise increases in the high load region. So the technology of Patent Document 1 was developed to inhibit such engine speed rise related to the hybrid-type engine generator.

The technology of Patent Document 1 is adapted on the one hand to respond to battery output being of predetermined value or greater by holding engine speed constant to generate fixed power output while simultaneously making up for any shortfall with battery output and on the other hand to respond to battery output having fallen below predetermined value by gradually increasing engine speed to gradually increase generated power output while simultaneously decreasing battery output.

PRIOR ART DOCUMENTS

Patent Document

Patent Document 1: Japanese Unexamined Patent Publication No. 2011-234458A

SUMMARY OF THE INVENTION

Problem to be Solved by the Invention

Patent Document 1 adopts the aforesaid configuration in order to avoid noise increase by inhibiting engine speed increase. The present invention is similarly directed to providing a hybrid-type engine generator controller adapted to avoid noise increase by inhibiting engine speed increase.

Means for Solving the Problem

The invention provides an inverter generator controller having a battery and an engine generator unit driven by the engine and equipped with a power conversion unit including an alternator and an inverter having switching elements, a DC-DC converter connected between the battery and the power conversion unit and an electrical load connected to the engine generator unit, comprising: a battery SOC detecting unit that detects residual charge of the battery; a generated power output detecting unit that detects generated power output of the engine generator unit; a load output demand detecting/control unit that detects load output demand from the electrical load connected to the electrical load and ON-OFF controls the switching elements of the inverter so that AC power outputted from the inverter matches the detected load output demand from (output required by) the electrical load at desired frequency; a charge implementation unit that implements low-load charging of the battery if the detected generated power output of the engine generator unit is equal to or greater than the detected load output demand and the detected generated power output of the engine generator unit is less than a predetermined low-load value a, when the detected residual charge of the battery is equal to or less than a first threshold value unless the battery is determined to be fully charged from the detected residual charge of the battery; and a charge termination unit that terminates low-load charging of the battery when the detected residual charge of the battery becomes greater than the first threshold value.

MODE FOR CARRYING OUT THE INVENTION

A hybrid-type engine generator controller according to an embodiment of this invention is explained with reference to the attached drawings in the following.

Figure 1:
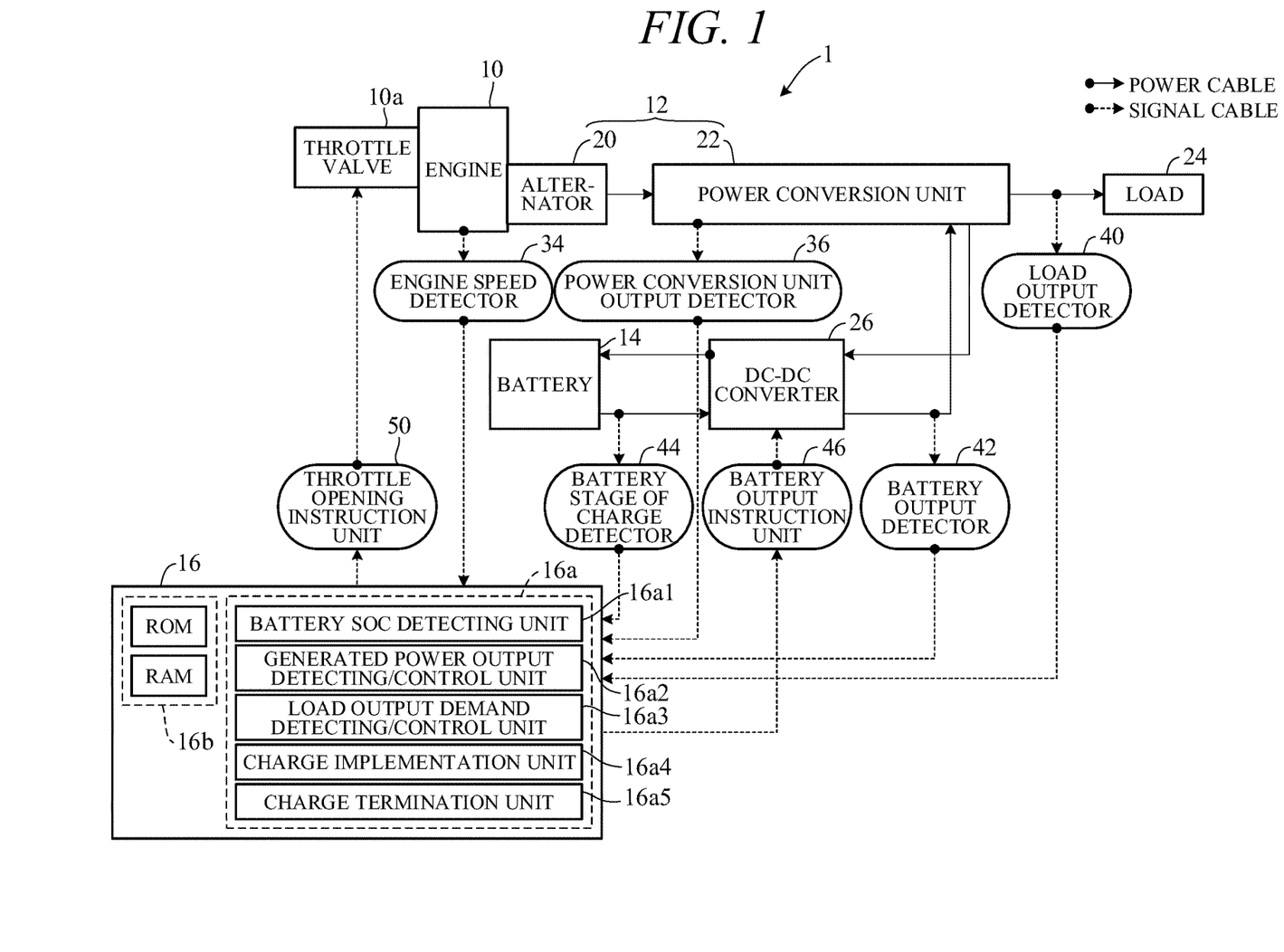
FIG. 1 is a schematic diagram generally illustrating a hybrid-type engine generator controller according to an embodiment of this invention.
Figure 2:
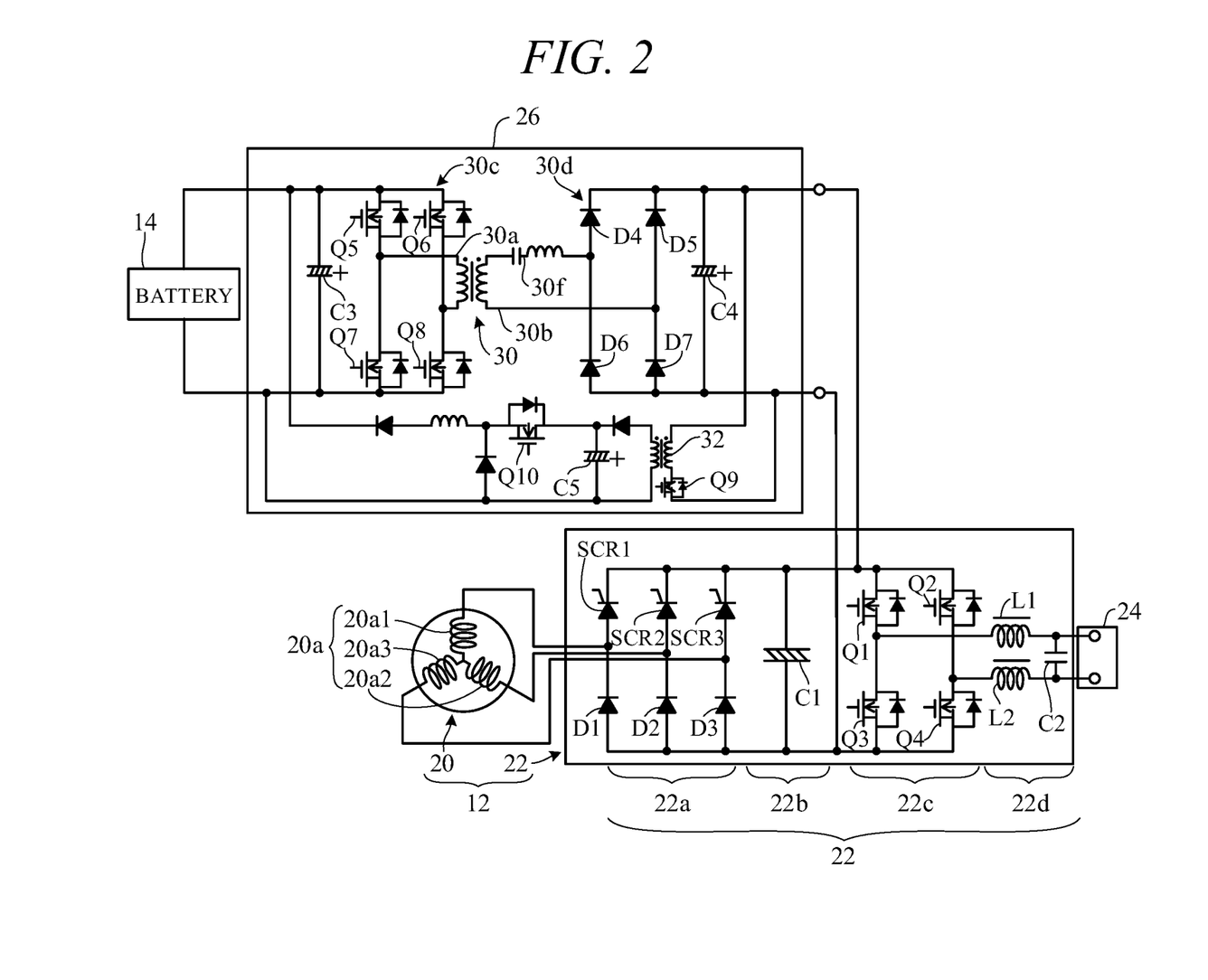
FIG. 2 is a circuit diagram showing structural details of an engine generator unit and other elements of FIG. 1.

FIG. 1 is a schematic diagram generally illustrating a hybrid-type engine generator controller according to an embodiment of this invention, and FIG. 2 is a circuit diagram showing structural details of an engine generator unit and other elements of FIG. 1.

As shown in FIG. 1, a hybrid-type engine generator (hereinafter sometimes called "generator") 1 comprises an engine 10, an engine generator unit 12 driven by the engine 10, a battery 14, and an electronic control unit (hereinafter sometimes called "ECU") 16 for controlling operation of these elements. The ECU 16 is a microcomputer including, inter alia, at least a processor (CPU) 16a and at least one memory (ROM, RAM) 16b connected to the processor 16a. The engine generator unit 12 is equipped with an alternator 20 and a power conversion unit 22.

The engine 10 is, for example, a spark ignition, air cooled, gasoline fueled engine with pistons (not shown) that reciprocate inside cylinders and a crankshaft (output shaft; not shown) that rotates synchronously with the pistons. Rotation of the engine 10 is regulated by a throttle valve 10a driven by an actuator.

Motive power of the engine 10 is transmitted through the crankshaft to drive the alternator 20 of the engine generator unit 12. The alternator 20, which is of multipolar type, comprises a rotor (not shown) that is connected to and rotated integrally with the crankshaft and is provided with permanent magnets therearound and a stator (not shown) that is arranged concentric with the rotor to face a peripheral surface thereof and is provided with UVW windings 20a arranged at phase angles of 120 degrees as shown in FIG. 2.

As shown in FIG. 2, the power conversion unit 22 comprises a rectifier 22a, a direct current unit 22b, an inverter 22c and a wave shaping circuit 22d.

The rectifier 22a is constituted of a hybrid bridge rectifier circuit comprising bridge connected thyristors SCR1, SCR2 and SCR3 and diodes D1, D2 and D3.

Among the three phase windings 20a of the alternator 20, U phase component 20a1 is connected to the junction between SCR1 and D1, V phase component 20a2 is connected to the junction between SCR2 and D2, and W phase component 20a3 is connected to the junction between SCR3 and D3.

The rectifier 22a rectifies output of the alternator 20 and sends the rectified output to the direct current unit 22b and also functions as drive means responsive to ON-OFF switching of SCR1 to SCR3 by the ECU 16 for converting DC output voltage from the battery 14 to three phase AC voltage applied to the alternator 20. The direct current unit 22b is formed by a capacitor C1.

The inverter 22c comprises bridge-connected switching elements Q1, Q2, Q3 and Q4 and diodes connected in parallel with the switching elements. Output of the inverter 22c is input to the wave shaping circuit 22d comprising coils L1 and L2 and a capacitor C2. The stage following the wave shaping circuit 22d is a load (electrical load) 24.

The battery 14 is connected to the power conversion unit 22 through an isolated DC-DC converter 26. The DC-DC converter 26 supplies power both ways between the battery 14 and the direct current unit 22b. The DC-DC converter 26 corresponds to the charging power converter and the output power converter indicated in FIG. 1.

The DC-DC converter 26 is equipped with a primary side low-voltage side winding 30a and a secondary side high-voltage side winding 30b of a transformer 30 and with a low-voltage side switching unit 30c connected to the low-voltage side winding 30a and a rectifier 30d connected to the high-voltage side winding 30b.

The low-voltage side switching unit 30c comprises bridge-connected switching elements Q5, Q6, Q7 and Q8 and diodes connected in parallel with the switching elements. The rectifier 30d comprises bridge-connected diodes D4, D5, D6 and D7.

The high-voltage side winding 30b incorporates an LC resonant circuit 30f and smoothing capacitors C3 and C4 are connected to the low-voltage side switching unit 30c and the rectifier 30d. Switching elements Q5 to Q8 of the low-voltage side switching unit 30c are ON-OFF controlled by the ECU 16.

A charging circuit is formed on input-output sides of a second transformer 32. The charging circuit comprises a switching element Q9 provided on input side of the second transformer 32 and a capacitor C5 and switching element Q10 provided on output side thereof. The ECU 16 ON-OFF controls the switching element Q9 to store DC voltage in the capacitor C5 and adjusts the stored voltage to a value suitable for charging the battery 14 by ON-OFF controlling the switching element Q10.

The ECU 16 synchronously drives the switching elements so that the DC-DC converter 26 performs power conversion in both directions.

In the illustrated configuration, therefore, when residual charge of the battery 14 is below predetermined value and generated power output of the engine generator unit 12 is adequate, output voltage of the direct current unit 22b is stepped up by the DC-DC converter 26 and input to the battery 14 (to charge the battery 14), while when residual charge of the battery 14 is high, output voltage of the direct current unit 22b augments (assists) output voltage of the engine generator unit 12, whereby power is supplied from the battery 14 to the load 24 via the DC-DC converter 26, the inverter 22c and the wave shaping circuit 22d.

In the power conversion unit 22, output voltage of the rectifier 22a is smoothed and adjusted by the direct current unit 22b, converted to AC power of predetermined frequency by the inverter 22c as elaborated later, and supplied to the load 24 through the wave shaping circuit 22d.

An engine speed detector 34 constituted of a magnetic pickup or the like provided in the engine 10, specifically near the stator of the alternator 20, detects rotational speed of the engine 10 commensurate with rotor rotational speed, and a power conversion unit output detector 36 constituted of a voltage-amperage sensor or the like provided in the power conversion unit 22 detects, inter alia, inter-terminal voltage of the capacitor C1 of the direct current unit 22b and generated power output of the engine generator unit 12.

A load output detector 40 constituted of a voltage-amperage sensor or the like provided upstream of the load 24 detects output required by the load 24.

A battery output detector 42 constituted of a voltage-amperage sensor or the like provided downstream of the DC-DC converter (output power converter) 26 detects power output (discharged) from the battery 14, and a battery state of charge detector 44 constituted of a voltage-amperage sensor or the like suitably installed at the battery 14 detects state of charge (SOC) of the battery 14.

Moreover, a battery output instruction unit 46 that instructs output (discharge) of the battery 14 is provided in the DC-DC converter (output power converter) 26.

An actuator of the throttle valve 10a of the engine 10 is connected to a throttle opening instruction unit 50 and opening-closing of throttle valve 10a is adjusted to correct throttle opening by driving the actuator in accordance with output of the throttle opening instruction unit 50.

Outputs of the aforesaid detectors are inputted to the ECU 16. The ECU 16 controls inter-terminal voltage of the capacitor C1 detected in the engine generator unit 12 to constant value irrespective of increase-decrease of load 24 and ON-OFF controls the switching elements Q1 to Q4 so that AC power output from the inverter 22c matches load output demand from (output required by) the load 24 at desired frequency.

Based on the received sensor outputs, the ECU 16 also operates through the battery output instruction unit 46 to instruct battery 14 output (discharge) and operates through the throttle opening instruction unit 50 to adjust throttle opening and control engine speed.

Moreover, as discussed later, the processor 16a in the ECU 16 operates in accordance with a program stored in the memory 16b to function as a battery SOC detecting unit 16a1 that detects residual charge of the battery 14, a generated power output detecting unit 16a2 that detects generated power output of the engine generator unit 12, a load output demand detecting/control unit 16a3 that detects load output demand from (output required by) the load 24 and ON-OFF controls the switching elements Q1 to Q4 of the power conversion unit 22 so that AC power outputted from the inverter 23c matches the detected load output demand from (output required by) the electrical load at desired frequency, a charge implementation unit 16a4 that implements low-load charging of the battery if the detected generated power output of the engine generator unit is equal to or greater than the detected load output demand and the detected generated power output of the engine generator unit is less than a predetermined low-load value a, when the detected residual charge of the battery is equal to or less than a first threshold value, and a charge termination unit 16a5 that terminates low-load charging of the battery when the aforesaid detected residual charge of the battery becomes greater than the first threshold value. In other words, a configuration is adopted whereby residual charge of the battery 14 is detected, generated power output of the engine generator unit 12 is detected, load output demand from (output required by) the load 24 is detected, and if the detected generated power output of the engine generator unit is equal to or greater than the detected load output demand and the detected generated power output of the engine generator unit is less than a predetermined low-load value a, when the detected residual charge of the battery being equal to or less than a first threshold value, low-load charging of the battery is implemented, and when the aforesaid detected residual charge of the battery becomes greater than the first threshold value, low-load charging of the battery is terminated.

Figure 3:
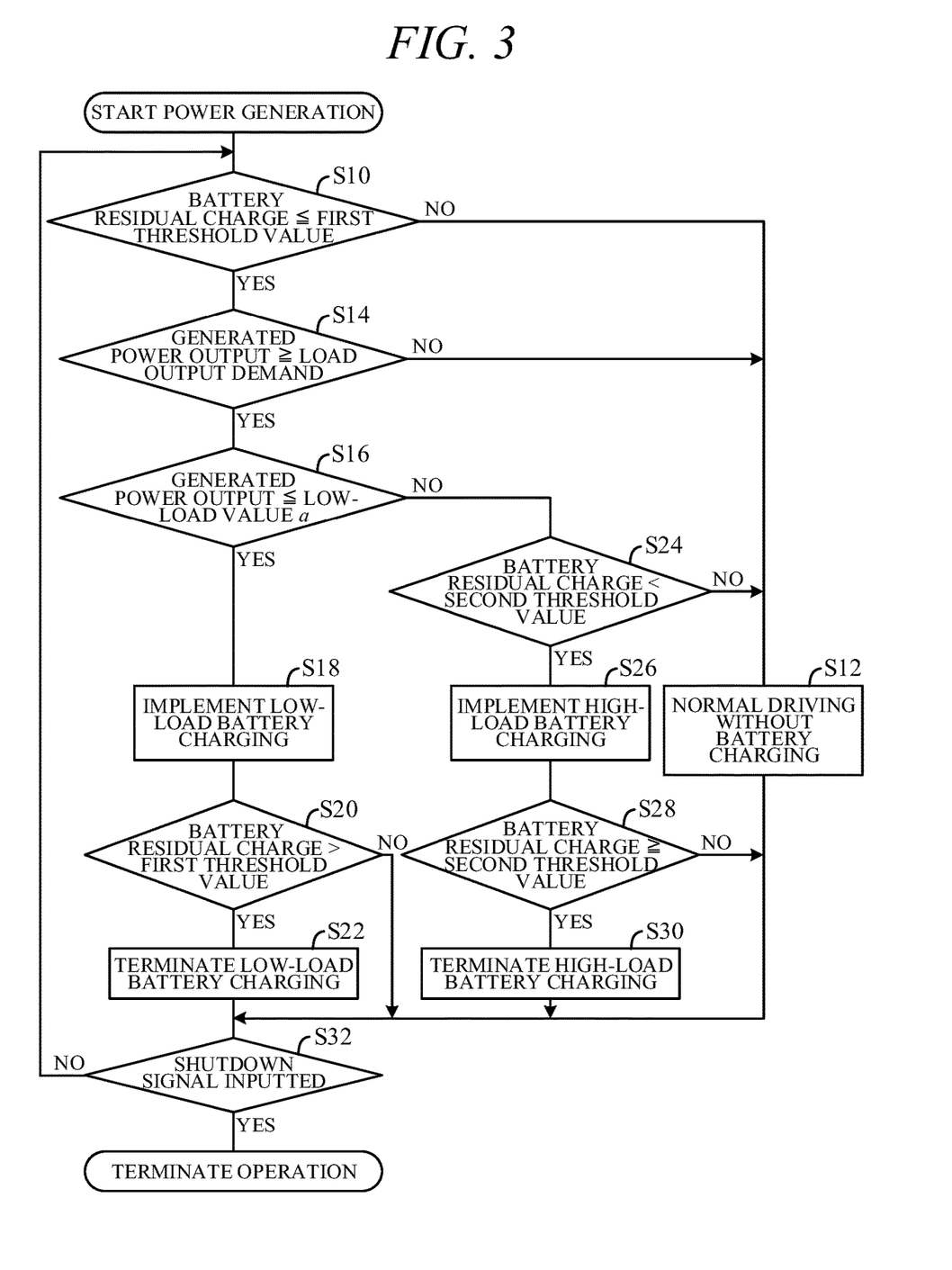
FIG. 3 is a flowchart showing operation of the engine generator controller of FIG. 1.
Figure 4:
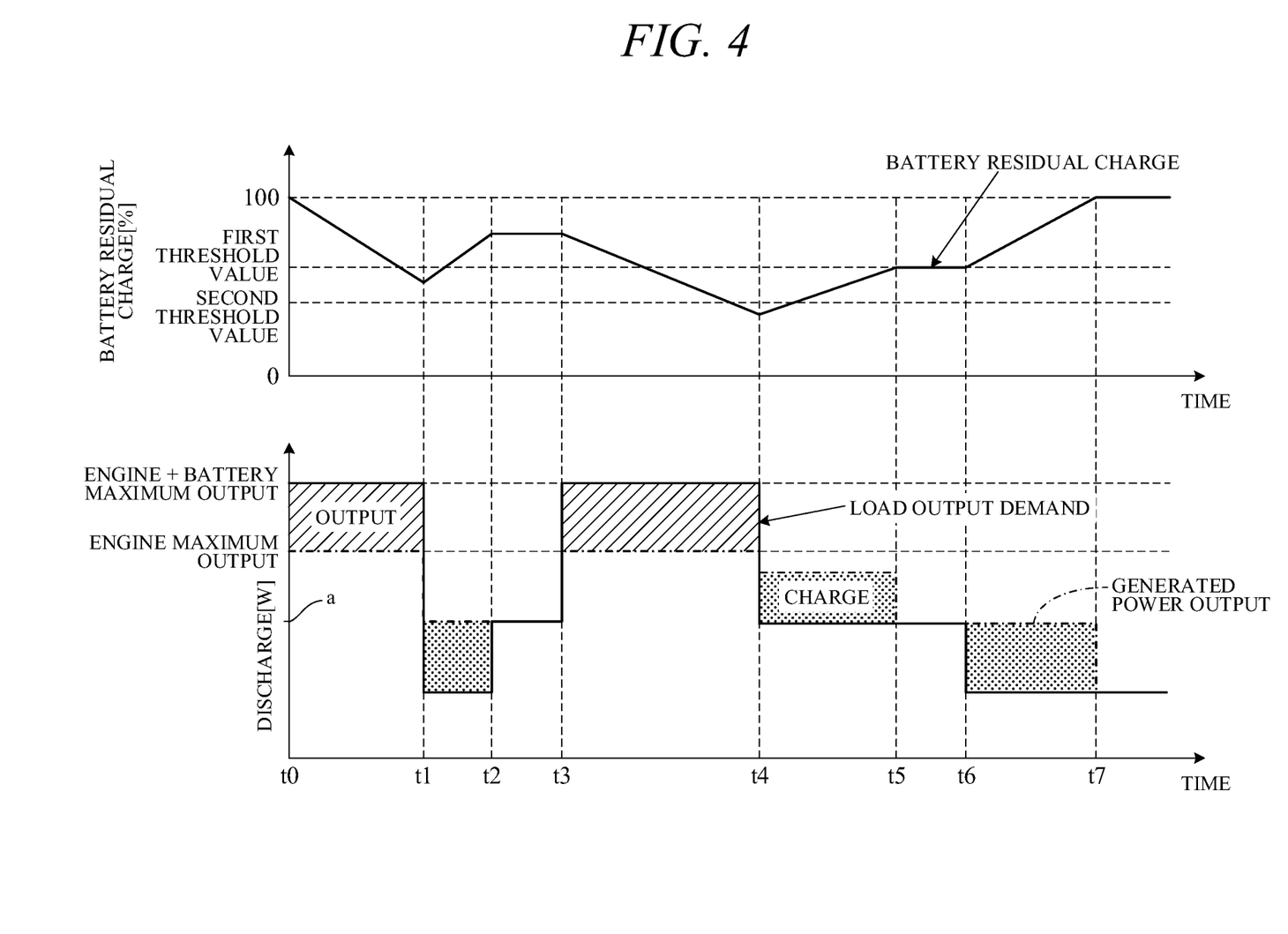
FIG. 4 is a time chart for explaining the processing of FIG. 3 flowchart.

FIG. 3 is a flowchart showing operation of the controller of the engine generator 1 according an embodiment, more specifically processing operations of the ECU 16, and FIG. 4 is a time chart for explaining the processing of FIG. 3.

To explain with reference to FIG. 3, is determined in S10 whether residual charge of the battery 14 detected by the battery state of charge detector 44 is equal to or less than a first threshold value (S: processing Step). The first threshold value is shown at the top of FIG. 4. In this specification, residual charge of the battery 14 is expressed as ratio (%) relative to fully charged state of the battery 14.

When the result in S10 is NO, the program goes to S12 to transition to normal driving without charging the battery 14, and when YES, goes to S14 to determine (discriminate) whether generated power output of the engine generator unit 12 detected by the power conversion unit output detector 36 is equal to or greater than load output demand from (output required by) the load 24 detected by the load output detector 40. In FIG. 4, generated power output of the engine generator unit 12 is indicated by a one-dot-dashed line and load output demand is indicated by a solid line.

When the result in S14 is NO, the program goes to S12, and when YES, goes to S16 to determine (discriminate) whether detected generated power output of the engine generator unit 12 is equal to or less than a predetermined low-load value a. Low-load value a is indicated at the bottom of FIG. 4.

When the result in S16 is YES, the program goes to S18 to implement low-load charging of the battery 14. Since the engine generator unit 12 has surplus power capacity during low-load charging, more power can be charged than by high-load charging discussed later.

Next, in S20, it is determined (discriminated) whether detected residual charge of the battery 14 has become greater than the first threshold value.

When the result in S20 is YES, the program goes to S22 to terminate the low-load charging of the battery 14 implemented in S18, and when NO, skips the processing of S22.

On the other hand, when the result in S16 is NO, the program goes to S24 to determine (discriminate) whether detected residual charge of the battery 14 has become less that a second threshold value, then goes to S26 to implement high-load charging when the result is YES and goes to S12 when the result is NO. The second threshold value is shown at the top of FIG. 4. As illustrated, the second threshold value is set lower than the first threshold value.

Next, the program goes to S28 to determine (discriminate) whether detected residual charge of the battery 14 has become equal to or greater than the second threshold value. When the result in S28 is YES, the program goes to S30 to terminate the high-load charging of the battery 14 implemented in S26, and when NO, skips the processing of S28.

After executing either of S22 and S30, the program goes to S32 to determine whether a shutdown signal was input, and when the result is YES, operation of the generator 1 is terminated, and when NO, the program returns to S10 to repeat the aforesaid processing.

Now to explain the foregoing in line with the time chart of FIG. 4, at time t0, since load output demand exceeds generated power output of the engine generator unit 12, maximum discharge power is output from the battery 14 in order to assist the generator 1.

When, at time t1, battery residual charge falls to first threshold value or less and load output demand falls to less than generated power output, i.e., when generated power output is equal to or greater than load output demand and the engine generator 1 therefore has surplus power capacity, discharge from the battery 14 is terminated and low-load charging of the battery 14 is implemented.

At time t2, since residual charge of the battery 14 is greater than first threshold value, low-load charging of the battery 14 is terminated. Although the time at which residual charge of the battery 14 becomes greater than the first threshold value is earlier than time t2, low-load charging is continued to the utmost possible so long as the battery 14 does not become fully charged.

Between time t2 and t3, no charging is performed and between time t3 and t4, similarly to between time t0 and t1, maximum power is discharged from the battery 14 in order to assist the generator 1.

Actual discharge and charge of the battery 14 is performed by the ECU 16, by controlling operation of the DC-DC converter 26.

Next, at time t4, when the generator 1 is in high-load region, residual charge of the battery 14 becomes less than the second threshold value set lower than the first threshold value, and high-load charging of the battery 14 is performed because the generator 1 has surplus power capacity owing to generated power output being equal to or greater than load output demand.

At time t5, high-load charging is terminated because residual charge of the battery 14 is equal to or greater than the second threshold value (is actually equal to the first threshold value). During the ensuing period between time t5 and t6, discharge is not performed because the required conditions are not met. Namely, although value of battery residual charge is equal to the first threshold value, low-load charging is not performed because the engine generator 1 has no surplus capacity.

Next, at time t6, battery residual charge becomes equal to or less than the first threshold value (actually becomes equal to the first threshold value) and low-load charging of the battery 14 is implemented because the engine generator 1 has capacity to spare owing to generated power output being equal to or greater than load output demand.

In other words, although battery residual charge value is equal to the first threshold value and is not necessarily inadequate, the engine generator unit 12 of the generator 1 is operating in low-load region, so the low-load charging implemented between time t1 and t2 is positively utilized.

Next, at time t7, charging is terminated because the battery 14 is fully charged and further charging is impossible.

By this embodiment, noise increase can be avoided by minimizing engine speed because the adopted configuration responds to residual charge of the battery 14 falling to or less than the first threshold value by positively implementing low-load charging of the battery 14 when generated power output of the engine generator unit 12 is equal to or greater than load output demand and equal to or less than predetermined low-load value a.

As described in the foregoing, the embodiment is configured such that, the controller of the hybrid-type generator 1 having the battery 14 and the engine generator unit 12 driven by the engine 10 and equipped with the power conversion unit 22 including the alternator 20 and the inverter 22c having switching elements Q1, Q2, Q3, Q4, the DC-DC converter 26 connected between the battery 14 and the power conversion unit 22, and an electrical load connected to the engine generator unit 12, comprise: the battery SOC detecting unit (16a1, 44, S10) that detects residual charge of the battery 14; the generated power output detecting unit (16a2, 36, S14) that detects generated power output of the engine generator unit 12; the load output demand detecting/control unit (16a3, 40, S14) that detects load output demand from (output required by) the electrical load 24 and ON-OFF controls the switching elements Q1 to Q4 of the power conversion unit 22 so that AC power outputted from the inverter matches the detected load output demand from (output required by) the electrical load 24 at desired frequency; the charge implementation unit (16a4, S10 to S18, S20, S24 to S30) that implements low-load charging of the battery 14 if the detected generated power output of the engine generator unit is equal to or greater than the detected load output demand and the detected generated power output of the engine generator unit is less than the predetermined low-load value a, when the detected residual charge of the battery is equal to or less than the first threshold value unless the battery is determined to be fully charged from the detected residual charge of the battery; and the charge termination unit (16a5, S22) that terminates low-load charging of the battery 14 when the detected residual charge of the battery becomes greater than the first threshold value. With this, the battery 14 can be proactively charged during low load so as to minimize engine speed and avoid noise increase, Moreover, the charge implementation unit is configured to respond to the detected residual charge of the battery 14 becoming less than the second threshold value, set lower than the first threshold value, by implementing high-load charging of the battery 14 when the detected generated power output of the engine generator unit 12 is not equal to or less than the predetermined low-load value a but equal to or greater than the detected load output demand (S24 to S28), so that in addition to realizing the aforesaid effects, the residual charge of the battery 14 is prevented from becoming zero because the battery is charged in the high-load region when residual charge of the battery 14 additionally decreases.

Moreover, a configuration is adopted whereby the charge termination unit terminates high-load charging of the battery 14 when the detected residual charge of the battery 14 becomes equal to or greater than the second threshold value (S28, S30), so that in addition to realizing the aforesaid effects, noisy high-load charging can be minimized to the utmost possible.

As described in the foregoing, the embodiment is configured such that control method of the hybrid-type generator 1 having the battery 14 and the engine generator unit 12 driven by the engine 10 and equipped with the power conversion unit 22 including the alternator 20 and the inverter 22c having switching elements Q1, Q2, Q3, Q4, the DC-DC converter 26 connected between the battery 14 and the power conversion unit 22, and an electrical load connected to the engine generator unit 12, comprise; battery SOC detecting step (S10) that detects residual charge of the battery 14; generated power output detecting step (S14) that detects generated power output of the engine generator unit 12; load output demand detecting/control step (16a3, 40, S14) that detects load output demand from the electrical load 24 and ON-OFF controls the switching elements Q1 to Q4 of the inverter 22 so that AC power outputted from the inverter matches the detected load output demand from (output required by) the electrical load 24 at desired frequency; the charge implementation step (S16 to S18, S20, S24 to S30) that implements low-load charging of the battery 14 if the detected generated power output of the engine generator unit is greater than the detected load output demand and the detected generated power output of the engine generator unit 12 is less than the predetermined low-load value a, when the detected residual charge of the battery is equal to or less than the first threshold value unless the battery is determined to be fully charged from the detected residual charge of the battery; and charge termination step (S22) that terminates low-load charging of the battery 14 when the detected residual charge of the battery becomes greater than the first threshold value. With this, the battery 14 can be proactively charged during low load so as to minimize engine speed and avoid noise increase, as described in the foregoing, Moreover, the charge implementation step is configured to respond to the detected residual charge of the battery 14 becoming less than the second threshold value, set lower than the first threshold value, by implementing high-load charging of the battery 14 when the detected generated power output of the engine generator unit 12 is not equal to or less than the predetermined low-load value a but equal to or greater than the detected load output demand (S24 to S28), so that in addition to realizing the aforesaid effects, the residual charge of the battery 14 is prevented from becoming zero because the battery is charged in the high-load region when residual charge of the battery 14 additionally decreases.

Moreover, a configuration is adopted whereby the charge termination step terminates high-load charging of the battery 14 when the detected residual charge of the battery 14 becomes equal to or greater than the second threshold value (S28, S30), so that in addition to realizing the aforesaid effects, noisy high-load charging can be minimized to the utmost possible.

As described in the foregoing, the embodiment is configured such that controller of the hybrid-type generator 1 having the battery 14 and the engine generator unit 12 driven by the engine 10 and equipped with the power conversion unit 22 including the alternator 20 and the inverter 22c having switching elements Q1, Q2, Q3, Q4, the DC-DC converter 26 connected between the battery 14 and the power conversion unit 22, and an electrical load connected to the engine generator unit 12, comprise; the ECU 16 including, inter alia, at least a processor 16a and at least one memory 16b connected to the processor 16a so that the processor 16a in the ECU 16 operates in accordance with a program stored in the memory 16b to function to detect residual charge of the battery 14 (S10); detect generated power output of the engine generator unit 12 (S14); detect load output demand from the load 24 (S14) and ON-OFF controls the switching elements Q1 to Q4 of the inverter 22 so that AC power outputted from the inverter matches the detected load output demand from (output required by) the electrical load 24 at desired frequency; implement low-load charging of the battery 14 if the detected generated power output of the engine generator unit is equal to or greater than the detected load output demand and the detected generated power output of the engine generator unit 12 is less than the predetermined low-load value a, when the detected residual charge of the battery is equal to or less than the first threshold value unless the battery is determined to be fully charged from the detected residual charge of the battery (S10 to S18, S20, S24 to S30); and terminate low-load charging of the battery 14 when the detected residual charge of the battery becomes greater than the first threshold value (S22). With this, the battery 14 can be proactively charged during low load so as to minimize engine speed and avoid noise increase, Moreover, the processor 16a is configured to respond to the detected residual charge of the battery 14 becoming less than the second threshold value, set lower than the first threshold value, by implementing high-load charging of the battery 14 when the detected generated power output of the engine generator unit 12 is not equal to or less than the predetermined low-load value a but equal to or greater than the detected load output demand (S24 to S28), so that in addition to realizing the aforesaid effects, the residual charge of the battery 14 is prevented from becoming zero because the battery is charged in the high-load region when residual charge of the battery 14 additionally decreases.

Moreover, the processor 16a is configured to terminate high-load charging of the battery 14 when the detected residual charge of the battery 14 becomes equal to or greater than the second threshold value (S28, S30), so that in addition to realizing the aforesaid effects, noisy high-load charging can be minimized to the utmost possible.

It should be noted in the above that the control illustrated in FIG. 4 is an example and the invention should not be limited thereto.

INDUSTRIAL APPLICABILITY

The inverter generator controller according to this invention can be optimally utilized in power generators driven by an engine.

DESCRIPTION OF SYMBOLS 1 engine generator, 10 engine, 14 battery, 16 electronic control unit (ECU), 16a processor, 16b memory, 16a1 battery SOC detecting unit, 16a2 generated power output detecting unit, 16a3 load output demand detecting/control unit, 16a4 charge implementation unit, 16a5 charge termination unit, 20 alternator, 22 power conversion unit, 22a rectifier, 22b direct current unit, 22c inverter, 22d wave shaping circuit, 24 load, 26 DC-DC converter, 30 transformer, 32 second transformer, 34 engine speed detector, 36 power conversion unit output detector, 40 load output detector, 42 battery output detector, 44 battery stage of charge detector, 46 battery output instruction unit, 50 throttle opening instruction unit.

The invention claimed is:

1. An inverter generator controller, comprising:
an engine;
an engine generator unit equipped with an alternator driven by the engine and a power conversion unit including an inverter having switching elements;
a battery connected to the power conversion unit through a DC-DC converter;
an electrical load connected to the power conversion unit and supplied with generated power from the alternator and discharged power from the battery through the power conversion unit;
a battery residual charge detector configured to detect residual charge of the battery;
a power conversion unit output detector configured to detect the generated power;
a load output demand detector configured to detect a load output demand from the electrical load; and
an electronic control unit configured to control the engine, the engine generator unit, and the battery, wherein the electronic control unit:
ON-OFF controls the switching elements of the inverter so that AC power outputted from the inverter matches the load output demand detected by the load output demand detector at a desired frequency;
implements low-load charging of the battery if the generated power detected by the power conversion unit output detector is equal to or greater than the load output demand detected by the load output demand detector and the generated power is less than a predetermined low-load value, when the residual charge detected by the battery residual charge detector is equal to or less than a first threshold value unless the battery is determined to be fully charged based on the residual charge detected by the battery residual charge detector;
terminates the low-load charging when the residual charge detected by the battery residual charge detector becomes equal to or greater than the first threshold value; and
implements high-load charging of the battery if the generated power detected by the power conversion unit output detector is greater than the predetermined low-load value and the generated power is equal to or greater than the load output demand detected by the load output demand detector, when the residual charge detected by the battery residual charge detector is less than a second threshold value that is set less than the first threshold value.

2. The inverter generator controller according to claim 1, wherein
the electronic control unit terminates the high-load charging when the residual charge detected by the battery residual charge detector becomes equal to or greater than the second threshold value.

3. The inverter generator controller according to claim 1, wherein the electronic control unit implements the low-load charging by an amount greater than the high-load charging.

* * * * *